(12) United States Patent
Zhang et al.

(10) Patent No.: US 12,081,282 B2
(45) Date of Patent: Sep. 3, 2024

(54) BEAM REPORTING IN WIRELESS COMMUNICATION SYSTEM

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Wei Zeng, Saratoga, CA (US); Weidong Yang, San Diego, CA (US); Huaning Niu, San Jose, CA (US); Seyed Ali Akbar Fakoorian, San Diego, CA (US); Sigen Ye, Whitehouse Station, NJ (US)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 17/440,873

(22) PCT Filed: Oct. 6, 2020

(86) PCT No.: PCT/CN2020/119828
§ 371 (c)(1),
(2) Date: Sep. 20, 2021

(87) PCT Pub. No.: WO2022/073155
PCT Pub. Date: Apr. 14, 2022

(65) Prior Publication Data
US 2022/0321240 A1    Oct. 6, 2022

(51) Int. Cl.
*H04B 17/318* (2015.01)
*H04B 7/06* (2006.01)
*H04B 17/336* (2015.01)
*H04W 24/10* (2009.01)
*H04W 72/20* (2023.01)

(52) U.S. Cl.
CPC ......... *H04B 17/318* (2015.01); *H04B 7/0619* (2013.01); *H04B 17/336* (2015.01); *H04W 24/10* (2013.01); *H04W 72/20* (2023.01)

(58) Field of Classification Search
CPC .. H04B 17/318; H04B 17/336; H04B 7/0619; H04B 7/063; H04B 7/0695; H04B 7/088;
(Continued)

(56) References Cited

U.S. PATENT DOCUMENTS

2019/0132066 A1* 5/2019 Park ................. H04W 24/10
2019/0312698 A1* 10/2019 Akkarakaran ........ H04W 52/42
(Continued)

FOREIGN PATENT DOCUMENTS

| CN | 110431901 | 11/2019 |
| WO | 2019215012 | 11/2019 |
| WO | WO 2020091576 A1 * | 5/2020 |

OTHER PUBLICATIONS

International Patent Application No. PCT/CN2020/119828, International Preliminary Report on Patentability, Apr. 20, 2023, 5 pages.
(Continued)

*Primary Examiner* — Rushil P. Sampat
(74) *Attorney, Agent, or Firm* — Kilpatrick Townsend & Stockton LLP

(57) ABSTRACT

The present application relates to devices and components including apparatus, systems, and methods to beam reporting using media access control element in wireless communication systems.

20 Claims, 10 Drawing Sheets

(58) Field of Classification Search
CPC .... H04W 72/20; H04W 24/10; H04L 5/0048; H04L 5/0094; H04L 5/0096; H04L 5/0025; H04L 5/0051
See application file for complete search history.

(56) References Cited

U.S. PATENT DOCUMENTS

2020/0145866 A1* 5/2020 Onggosanusi ........ H04L 5/0048
2021/0376894 A1* 12/2021 Cha ...................... H04B 7/0695

OTHER PUBLICATIONS

Further Discussion on Beam Management and CSI Acquisition, Xinwei, 3GPP TSG-RAN WG1 #87, R1-1612258, Nov. 18, 2016, 9 pages.

International Patent Application No. PCT/CN2020/119828, International Search Report and the Written Opinion, Mailed on Jul. 5, 2021, 9 pages.

3rd Generation Partnership Project; Technical Specification Group Radio Access Network; NR; Physical layer procedures for control (Release 16), 3GPP TS 38.213 V16.3.0, Sep. 2020, 179 pages.

3rd Generation Partnership Project; Technical Specification Group Radio Access Network; NR; Medium Access Control (MAC) protocol specification (Release 16), 3GPP TS 38.321 V16.2.1, Sep. 2020, 154 pages.

3rd Generation Partnership Project; Technical Specification Group Radio Access Network; NR; Radio Resource Control (RRC) protocol specification (Release 15), 3GPP TS 38.331 V15.11.0, Sep. 2020, 541 pages.

Technical Specification, entitled 3rd Generation Partnership Project; Technical Specification Group Radio Access Network; NR; Medium Access Control (MAC) protocol specification (Release 16); 3GPP TS 38.321 V16.2.1 (Sep. 2020) in 154 pages.

* cited by examiner

BEAM REPORTING IN WIRELESS COMMUNICATION SYSTEM

CROSS REFERENCE TO RELATED APPLICATION

This application is the U.S. National Phase of PCT Application No. PCT/CN2020/119828 filed Oct. 6, 2020, the disclosure of which is incorporated by reference.

BACKGROUND

Third Generation Partnership Project (3GPP) networks provide that a user equipment (UE) can report beam quality for corresponding beams by physical uplink control channel (PUCCH) or physical uplink shared channel (PUSCH). The beam quality may be layer 1 (L1) measurements of reference signal received power (RSRP) or signal-to-interference-plus-noise ratio (SINK). A gNB may configure a plurality of downlink reference signals for beam measurement and report.

DETAILED DESCRIPTION

Figure 1:
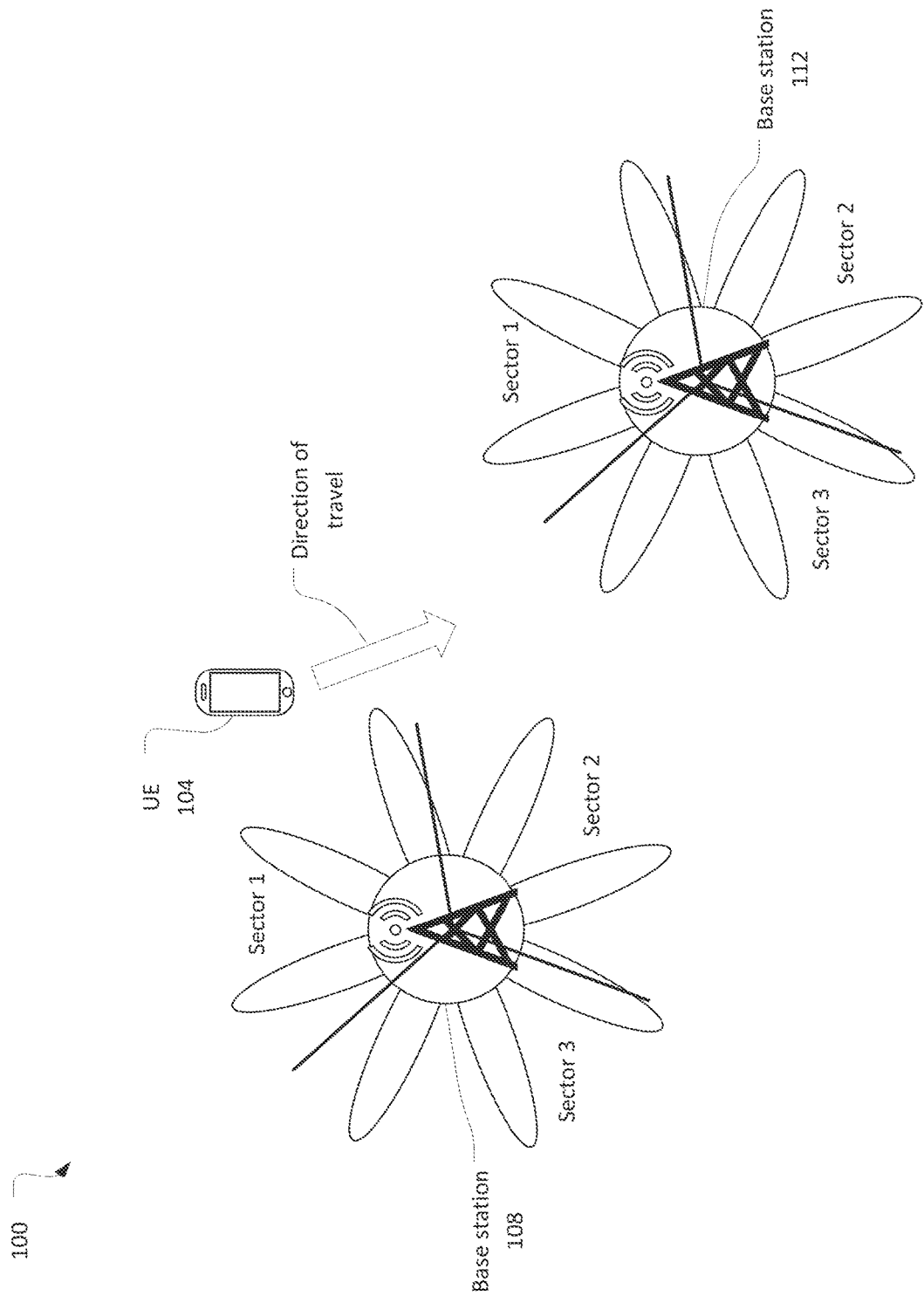
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and base stations 108 and 112. The base stations 108/112 may provide one or more wireless access cells, for example, 3GPP New Radio "NR" cells, through which the UE 104 may communicate with the base stations 108/112. The UE 104 and the base stations 108/112 may communicate over an air interface compatible with 3GPP technical specifications such as those that define Fifth Generation (5G) NR system standards. In some embodiments, the base stations 108/112 may be referred to as gNBs 108/112.

The UE 104 and the base stations 108/112 may include an array of antenna elements in one or more antenna panels that allow receive or transmit beamforming. Beamforming may improve the uplink and downlink budgets by determining and using uplink and downlink beams that increase antenna gain and overall system performance. The UE 104 and the base station 108/112 may determine desired uplink-downlink beam pairs using beam management operations based on reference signal measurements and channel reciprocity assumptions.

In the downlink direction, the base stations 108/112 may send beamformed reference signals that are measured by the UE 104 to determine the desired downlink beam pair for transmitting/receiving physical downlink control channel (PDCCH) and physical downlink shared channel (PDSCH) transmissions. The beamformed reference signals may be synchronization signal blocks (SSBs) or channel state information—reference signals (CSI-RSs). In some embodiments, the network elements may assume uplink/downlink beam correspondence and use the desired downlink beam pair as the desired uplink beam pair for PUSCH and PUCCH transmissions. In some embodiments, beam pairs may be independently determined for the uplink direction based on sounding reference signals (SRSs) transmitted by the UE 104. In various embodiments, beam management may include different stages such as initial acquisition of the uplink and downlink beams, later refinement of the uplink and downlink beams, and mobility.

The UE 104, while in a radio resource control (RRC)-idle mode, may perform an initial acquisition during a random access procedure using SSBs and physical random access channel (PRACH) preambles to establish uplink and downlink beam pairs. These initial beam pairs may correspond to relatively wide beams. The UE 104 may then enter an RRC-connected mode and initiate beam refinement procedures to select beams that are more directional and have higher gain. The beam refinement procedures may be based on CSI-RS.

Beam management may also include mobility operations that involve the UE 104 and the base stations 108/112 changing beams as the radio conditions change over time. Mobility may include inter-cell mobility and intra-cell mobility. Intra-cell mobility may include switching beams within one cell. As shown in FIG. 1, the base stations 108 and 112 may each be divided into three sectors. One cell may correspond to one sector. If an active beam is updated to another beam in the same sector, the mobility event may be considered and intra-cell mobility event. If the active beam is updated to another beam that is in a different sector, or provided by different base station altogether, the mobility event may be considered an inter-cell mobility event.

Beam management may be supported by measurements conducted at various layers of a communication protocol. For example, beam management may include Physical layer (or Layer 1 (L1)) measurements, Media Access Control (MAC) layer (or Layer 2 (L2)) measurements, and Radio Resource Control (RRC) layer (or Layer 3 (L3)) measurements.

L1 measurements may be used for procedures that benefit from having a small delay, for example, beam management procedures that result in the UE 104 rapidly switching between beams. L1 measurements are beam-level measurements that may be filtered to help reduce the impact of noise and to improve measurement accuracy. L2 measurements may be used to measure quality of service (QoS) performance such as packet delay. L3 measurements may be used for radio resource management decisions that benefit from a longer term view of channel conditions, for example, handover procedures. L3 measurements may be beam level or cell level measurements.

Historically, intra-cell mobility relied on L1/L2 procedures, while inter-cell mobility relied on L3 procedures.

Figure 2:
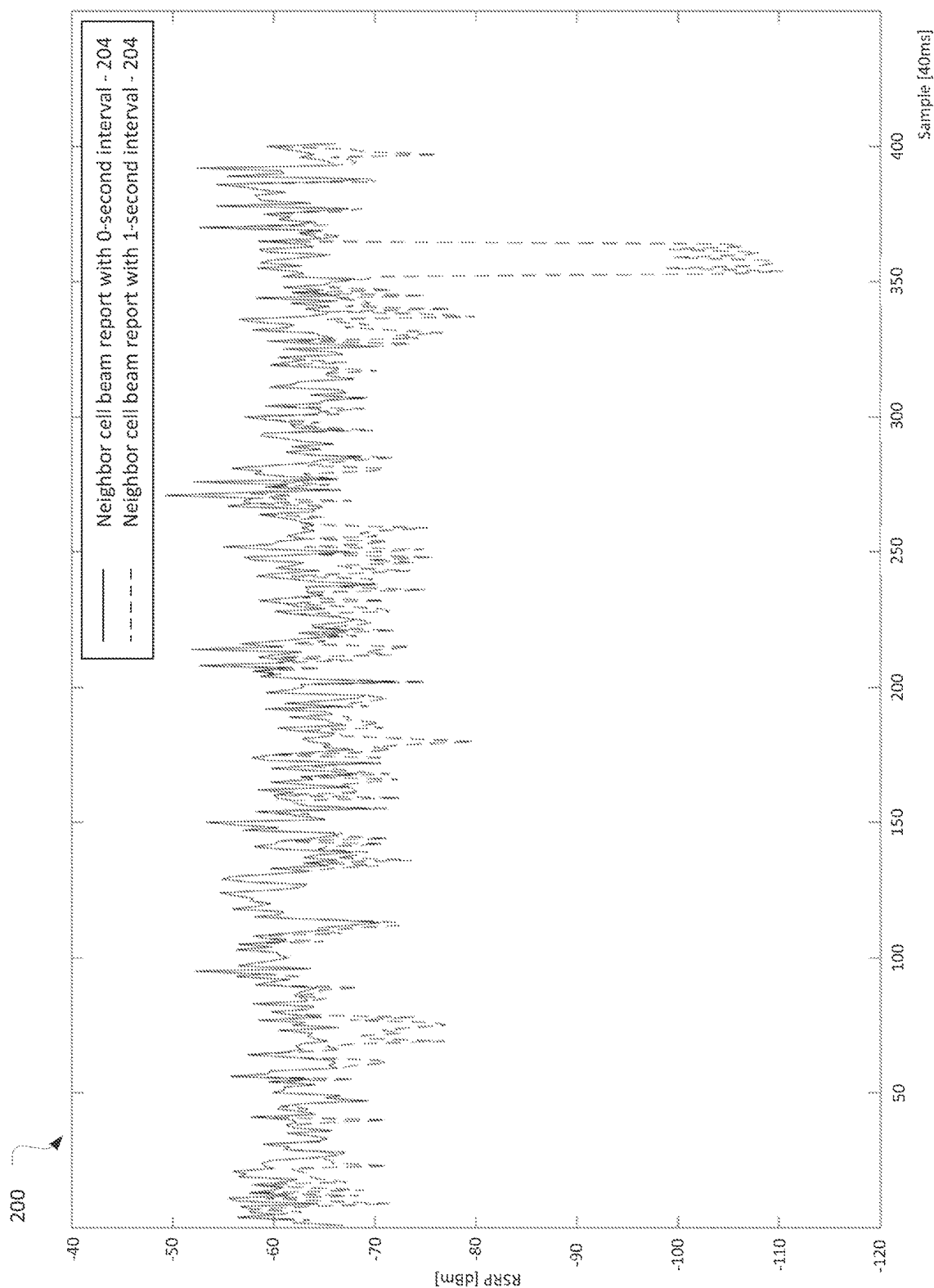
FIG. 2 is a graph with simulation data for neighbor cell beam reports with different reporting intervals.

Release 17 of 3GPP introduces support for inter-cell mobility based on L1 and L2 procedures. A base station may indicate a beam from a neighbor cell for the UE to measure. Failure of the UE to timely report the beam status may lead to incorrect or inefficient cell selection. For example, FIG. 2 illustrates a graph 200 based on handover simulations that compare performance of using neighbor cell beam report with 0-second delay (zero second report) 204 and using neighbor cell beam report with 1-second delay (one second report) 208. The RSRP for the performance associated with the one second report 208 drops over 40 dBm as compared to the RSRP for the performance associated with the zero second report 204. As can be seen from the system-level simulation results, a large beam report interval may result in incorrect cell selection, which may lead to performance degradation.

Embodiments of the present disclosure describe high-efficient beam reports based on MAC CEs. Various aspects include control signaling for the MAC CE, trigger conditions for the MAC CE, content for the MAC CE, priority of the MAC CE, and scheduling request (SR) for the MAC CE.

Figure 3:
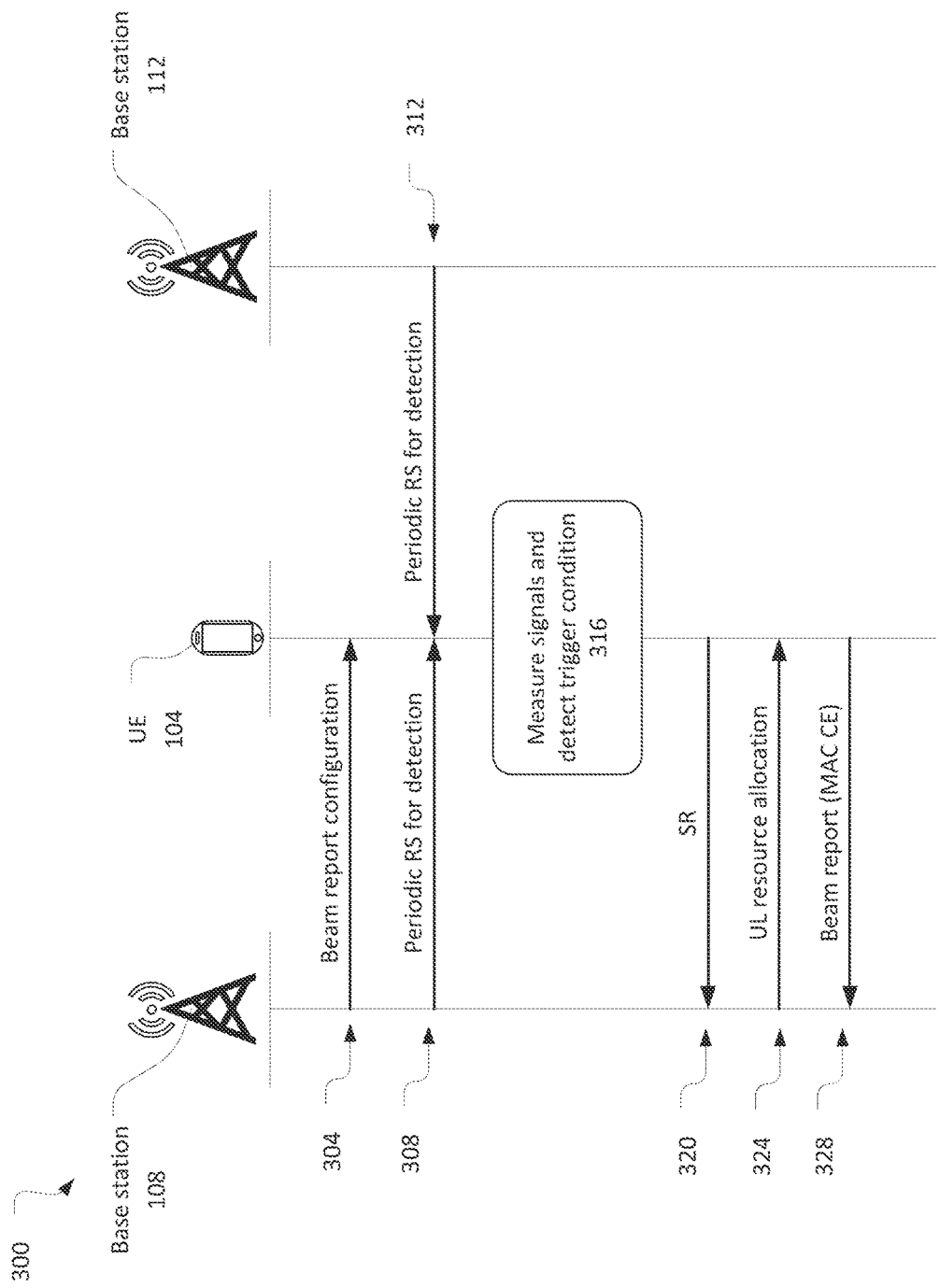
FIG. 3 is a flow diagram for beam reporting in accordance with some embodiments.

FIG. 3 illustrates a beam reporting procedure 300 in accordance with some embodiments. In this procedure, the base station 308 may be a serving base station and may have an active connection with the UE 304. The base station 312 may be a neighbor base station. However, in some embodiments, the base station 108 may control both serving cell and neighbor cell as shown in the sector examples from FIG. 1.

The beam reporting procedure 300 may be initiated with a beam report configuration transmitted from the base station 308 to the UE 304. The beam report configuration may be transmitted via RRC signaling and may configure the UE 304 for measuring beamformed reference signals and providing a corresponding beam report. The beam report may include a MAC CE. The beam report configuration 304 may include one or more configuration messages.

The beam report configuration 304 may include one or more of the following parameters: an indication of a value for periodic timer to configure a periodicity for a beam report; an indication of the value for a prohibit timer to be used to determine whether a MAC CE can be triggered or not within a time window; one or more thresholds (for example threshold 1, threshold 2, and threshold 3) to define a trigger condition; or a scheduling request identifier (ID) to be used to request a resource for the beam report.

In some embodiments, the beam report configuration 304 may also include information regarding beamformed reference signals that may be periodically transmitted for detection. The beamformed reference signals may be transmitted by the base station 108 at 308 or by the base station 112 at 312. The reference signals may be SSB or CSI-RS signals.

The beam reporting procedure 300 may include the UE measuring signals and detecting a trigger condition at 316. The trigger condition may be based on any combination of the parameters from the beam report configuration or measurements based on the periodic reference signals. Seven trigger conditions are defined herein, but others may also be incorporated by embodiments of this disclosure.

A first trigger condition may occur when a prohibit timer on the UE 104 expires and RSRP/SINR from a new beam is larger than that for one or more existing beams plus a first threshold. The UE 104 may set its prohibit timer based on an indication of a prohibit timer value in the beam report configuration. The UE 104 may measure the periodic RSs, sent on the new beam from a serving or neighbor cell, to determine RSRP/SINR measurement values. The first trigger condition may occur when these measurement values are greater than measurement values corresponding to active beams plus threshold 1 (indicated by the beam report configuration 304). Threshold 1 may be an offset that justifies switching from an existing beam to the new beam. For example, the new beam may need to have beam metrics greater than that of an existing beam by the offset in order to justify switching to the new beam.

In some embodiments, the measurement values based on the new beam may be compared to one currently active beam, a subset of the currently active beams, or all the active beams. The active beams, as used herein, may refer to active beam configurations for downlink/uplink channels. The active beam configurations may be given by transmission configuration indication (TCI) state configuration or spatial relation configuration information. For example, the UE 104 may be configured with a TCI state configuration per control resource set (CORESET). The UE 104 may monitor a search space associated with the CORESET to receive a PDCCH based on the TCI state configuration. Each TCI state configuration may include parameters on reference signal resources and quasi-co-location (QCL) relationships between reference signals and demodulation reference signal (DMRS) ports of the PDCCH with respect to QCL-Type A (corresponding to Doppler shift/spread, average delay, and delay spread) or QCL-Type D (corresponding to spatial receive parameters). Thus, the UE 104 may know that the beam used to receive the reference signal should also be used for receiving the PDCCH.

A second trigger condition may occur when the prohibit timer on the UE 104 expires and an RSRP minus a power management-maximum power reduction (P-MPR) from a new beam is larger than that of one or more active beams for an uplink channel plus threshold 2. The P-MPR may be the allowed maximum output reduction to ensure compliance with applicable electromagnetic energy absorption requirements. The P-MPR may impact the maximum uplink performance for a selected uplink transmission path. The second trigger condition may, therefore, occur when the maximum uplink performance of the new beam is greater than the maximum uplink performance of the existing beam by threshold 2. Similar to the first trigger condition, the one or more active beams referred to in the second trigger condition may be one active beam, a subset of active beams, or all active beams.

A third trigger condition may occur when padding is to be added to a MAC protocol data unit (PDU). Padding may be added to an end of a MAC PDU to ensure the PDU has an appropriate payload size. Typically, padding bits may be zero bit values that are discarded by the decoder. If the UE 104 detects that a sufficient number of padding bits are to be added to a MAC PDU, the UE 104 may instead, include the MAC CE in the MAC PDU. In this manner, the beam report information may be piggybacked on an existing MAC PDU to leverage its additional carrying capacity.

A fourth trigger condition may occur when a periodic timer expires. The UE 104 may set a periodic timer based on a value indicated in the beam report configuration 304. In this manner, a periodic beam report may be configured.

A fifth trigger condition may relate to discontinuous reception (DRX) operation. DRX may be a power-saving technique in which the UE 104 cycles between on-states, in which the UE 104 is actively monitoring the PDCCH, and off-states, in which the UE 104 powers-down components to reduce power consumption. The fifth trigger condition may occur when a duration of a DRX off-state exceeds threshold 3. The network may benefit from a beam report after long DRX off durations experienced in these instances.

The sixth trigger condition may occur when a new secondary cell (Scell) is activated. The network may activate a new Scell for data transmission in carrier aggregation scenarios. The radio environment may change upon activation of a new Scell. The network may benefit from reports related to the beams of the newly activated Scell. In these embodiments, the periodic reference signals transmitted at 308 may be transmitted from the new Scell, which may be provided by the base station 108 or base station 112.

The seventh trigger condition may occur when the prohibit timer expires and the UE 104 switches a configuration of an antenna panel. The UE 104 may need to switch antenna panels on/off or downlink/uplink. For example, proximity of one antenna panel to a user may necessitate switching that antenna panel off and relying on another antenna panel that is positioned further away from the user. Switching the antenna panels may affect the uplink/downlink performance of various beams. Therefore, after the antenna panel switch it may be prudent to update the beam information available to the network.

After measuring the signals and detecting the trigger condition at 316, the beam reporting procedure 300 may include transmitting a scheduling request at 320 and receiving a corresponding uplink resource allocation at 324. In some embodiments, uplink resources may be available to the UE 104 without requiring the messages 320/324. For example, in some embodiments uplink resource allocation may have been previously made available through a configured grant or random access channel resources discussed further below.

The beam reporting procedure 300 may include transmitting the beam report with a MAC CE at 328. The beam report may be transmitted to the base station 108. Utilizing a MAC CE to report the relevant beam information may allow the UE 104 more flexibility as opposed to relying on uplink control information (UCI) transmissions. This may reduce delayed reporting of information that could otherwise compromise handover performance.

The beam information conveyed by the MAC CE may be as follows. In some embodiments, the MAC CE may include information regarding N reference signals. The information may indexed by N resource indicators. The resource indicators may be SSB resource indicators or CSI-RS resource indicators.

In some embodiments, the beam information may include indications of measurement values corresponding to one or more of the N resource indicators. The measurement values may be RSRP/SINR measurement values. In some embodiments, measurement values may be provided for all N resource indicators. In other embodiments, measurement values may be provided for one resource indicator, which has the highest measurement value, and N−1 differential values (with respect to highest measurement value) may be provided for the other N−1 resource indicators. The differential signaling in these embodiments may reduce the overhead required to transmit the beam information for all the resource indicators.

The beam information may include an indication of one or more P-MPR values for the different reference signals. In some embodiments, one P-MPR value may be provided for all N reference signals. In other embodiments, one P-MPR value may be provided for each of the N reference signals. The one P-MPR value may correspond to the reference signal received from the same UE panel. In some embodiments, the P-MPR value may be reported per antenna panel of the UE 104.

The beam information may include an indication of one or more power headroom (PHR) values for the different reference signals. A PHR value may indicate how much transmission power remains left to use in addition to the power being used by current uplink transmission. Given that beam reports can be used for both uplink and downlink beam selection, the network may use the PHR related information to decide an uplink beam. In some embodiments, a PHR value may be provided for all N reference signals. In other embodiments, one PHR value may be provided. The one PHR value may correspond to the reference signal having the highest RSRP/SINR value.

The beam information may further include a serving cell index and a bandwidth part index. These indices may be used for cross-cell reports. For example, the UE 104 may include these indices to provide the base station 108 with information about a source of the measured reference signal, for example, base station 112.

The beam information may further include identifiers to imply or otherwise indicate an uplink/downlink panel corresponding to one or more of the reference signals.

In some embodiments, one or more first identifiers, for example, M1 IDs, may be used to imply downlink panel corresponding to the N reference signals. Some embodiments may include one M1 ID, which may imply that one downlink panel is used to receive all N reference signals. Other embodiments, may include up to N M1 IDs, which may imply that different downlink panels are used to receive different reference signals.

In some embodiments, one or more second identifiers, for example M2 IDs, may be used to imply uplink panel corresponding to the N reference signals. Some embodiments may include one M2 ID, which may imply that one uplink panel may be used to receive all N reference signals (after uplink panel switched to a downlink panel). Other embodiments, may include up to N M2 IDs, which may imply that different uplink panels may be used to receive different reference signals (after uplink panels switched to downlink panels).

In some embodiments, the UE 104 may determine a priority for the MAC CE of the beam report. Clause 5.4.3.1.3 of 3GPP Technical Specification (TS) 38.321 v16.1.0 (2020 Jul. 24) prioritizes logical channels in order of high-priority to low priority as follows: cell radio network temporary identifier (CE-RNTI) MAC CE or data from uplink-common control channel (UL-CCCH); configured grant confirmation MAC CE or beam failure report (BFR) MAC CE or multiple entry configured grant confirmation MAC CE; sidelink configured grant confirmation MAC CE; listen-before-talk (LBT) failure MAC CE; MAC CE for sidelink-buffer status report (SL-BSR) prioritized according to clause 5.22.1.6 of TS 38.321; MAC CE for BSR, with the exception of BSR included for padding; single entry power headroom report (PHR) MAC CE or multiple entry PHR MAC CE; MAC CE for a number of desired guards symbols; MAC CE for preemptive BSR; MAC CE for SL-BSR other than those prioritized according to clause 5.22.1.6 of TS 38.321 or included for padding; data from any logical channel other than data from UL-CCCH; MAC CE for recommended bit rate query; MAC CE for BSR included for padding; and MAC CE for SL-BSR included for padding. In various embodiments, the priority for the beam report MAC CE may be placed anywhere in this list of priorities. In a particular embodiment, the priority may be placed at the second level, for example, the second priority slot may be updated to "configured grant confirmation MAC CE or BFR MAC CE or multiple entry configured grant confirmation MAC CE or beam report MAC CE."

Figure 4:
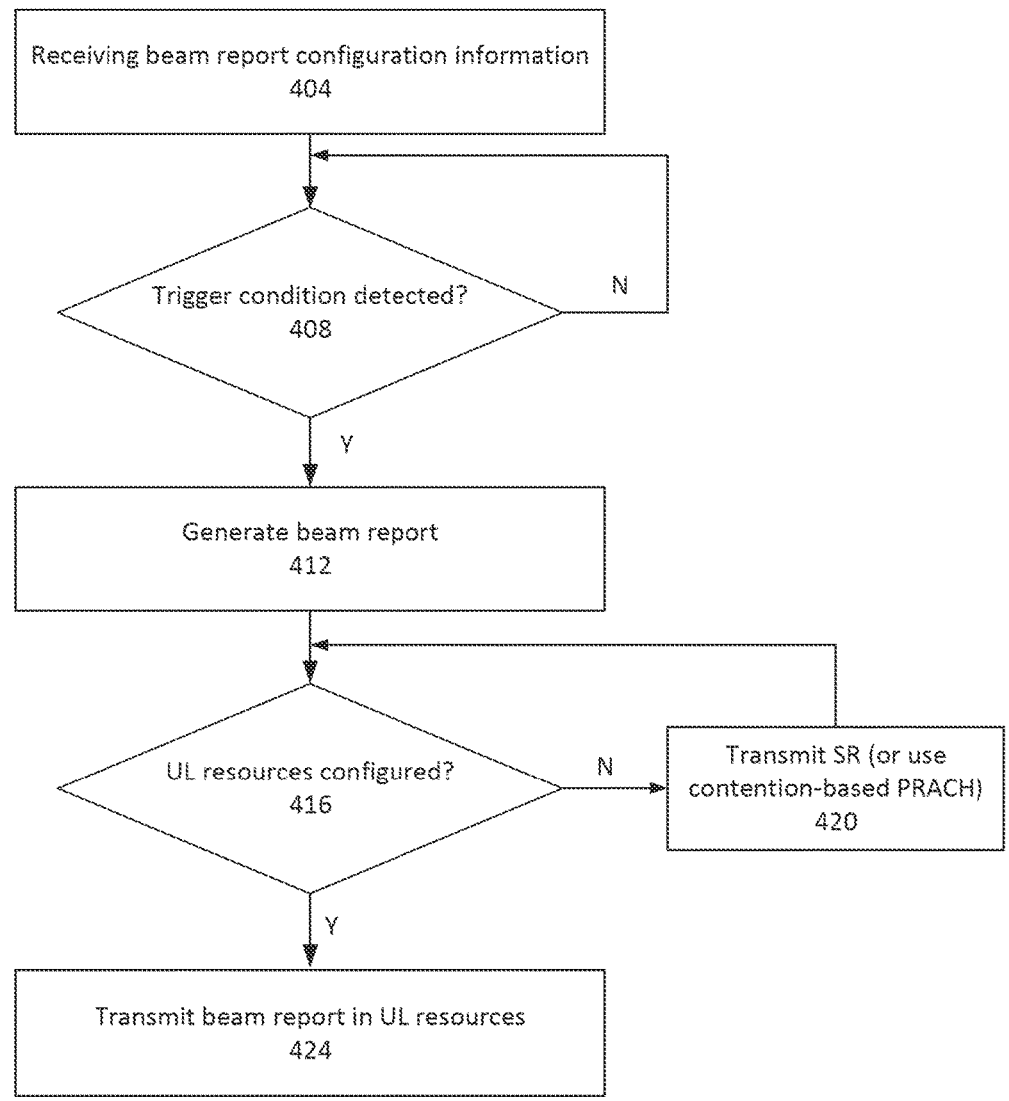
FIG. 4 illustrates an operational flow/algorithmic structure in accordance with some embodiments.

FIG. 4 illustrates an operation flow/algorithmic structure 400 in accordance with some embodiments. The operation flow/algorithmic structure 400 may be performed or implemented by a UE such as, for example, UE 104 or UE 900; or components thereof, for example, baseband processor 904A.

The operation flow/algorithmic structure 400 may include, at 404, receiving a beam report configuration information. The beam report configuration information may be transmitted by a serving base station using RRC signaling. The beam report configuration information may include information similar to that described above with respect to beam report configuration of FIG. 3.

The operation flow/algorithmic structure 400 may further include, at 408, determining whether a trigger condition is detected. The trigger condition may include one or more conditions similar to conditions 1-7 described herein. For example, the trigger condition may occur when: a prohibit timer expires and an RSRP/SINR from a new beam is larger than that for one of, a subset of, or all current active TCI states or spatial relation information for downlink/uplink channel plus threshold 1; a prohibit timer expires and an RSRP minus P-MPR from a new beam is larger than that for one of, a subset of, or all current active TCI states or spatial relation information for uplink channel plus threshold 2; some padding is to be added for a MAC PDU; a periodic timer expires; a DRX off duration exceeds threshold 3; or a new Scell is activated. If the trigger condition is not detected, the operation flow/algorithmic structure 400 may continue to monitor for occurrence of the trigger condition.

If the trigger condition is detected at 408, the operation flow/algorithmic structure 400 may advance to generating a beam report at 412. To generate the beam report, the UE 104 may generate a MAC CE with reporting parameters similar to those discussed above with respect to FIG. 3.

The operation flow/algorithmic structure 400 may include, at 416, determining whether UL resources are configured. Uplink resources may be configured in any of a number of ways. For example, the UE 104 may utilize configured random access channel (RACH) resources in which the UE 104 is allowed to transmit without an active uplink grant. In another embodiment, the UE 104 may utilize configured grant resources previously configured by RRC signaling.

If it is determined, at 416, that uplink resources are not configured, the operation flow/algorithmic structure 400 may include, at 420, transmitting an SR to request uplink resources for the beam report. In some embodiments, the SR may be a dedicated SR configured by the serving base station for beam reports. A dedicated SR may be indicated as such by inclusion of the scheduling request identifier that requests a resource for MAC CE transmission. The dedicated SR may have a priority that is greater than a normal SR. If a dedicated SR is not configured, the UE 104 may use a normal SR to request resources for beam report MAC CE. Thus, the normal SR may be used as a default SR when dedicated SR is not used.

In some embodiments, the dedicated SR may not be used at all and the UE 104 may use the normal SR to trigger resource for beam report MAC CE. The UE 104 may use a contention-based RACH procedure to request uplink resources for beam report MAC CE. In a contention-based RACH procedure, the UE may transmit a RACH preamble to a network (for example, the serving base station 108). The preamble may include a random access (RA)-RNTI, and an indication for a beam report message size. The network may respond with a random access response that includes the uplink grant for the beam report, a timing advance, and a temporary C-RNTI.

Once the UL resources are configured at 416, the operation flow/algorithmic structure 400 may advance to transmitting the beam report in the uplink resources at 424.

Figure 5:
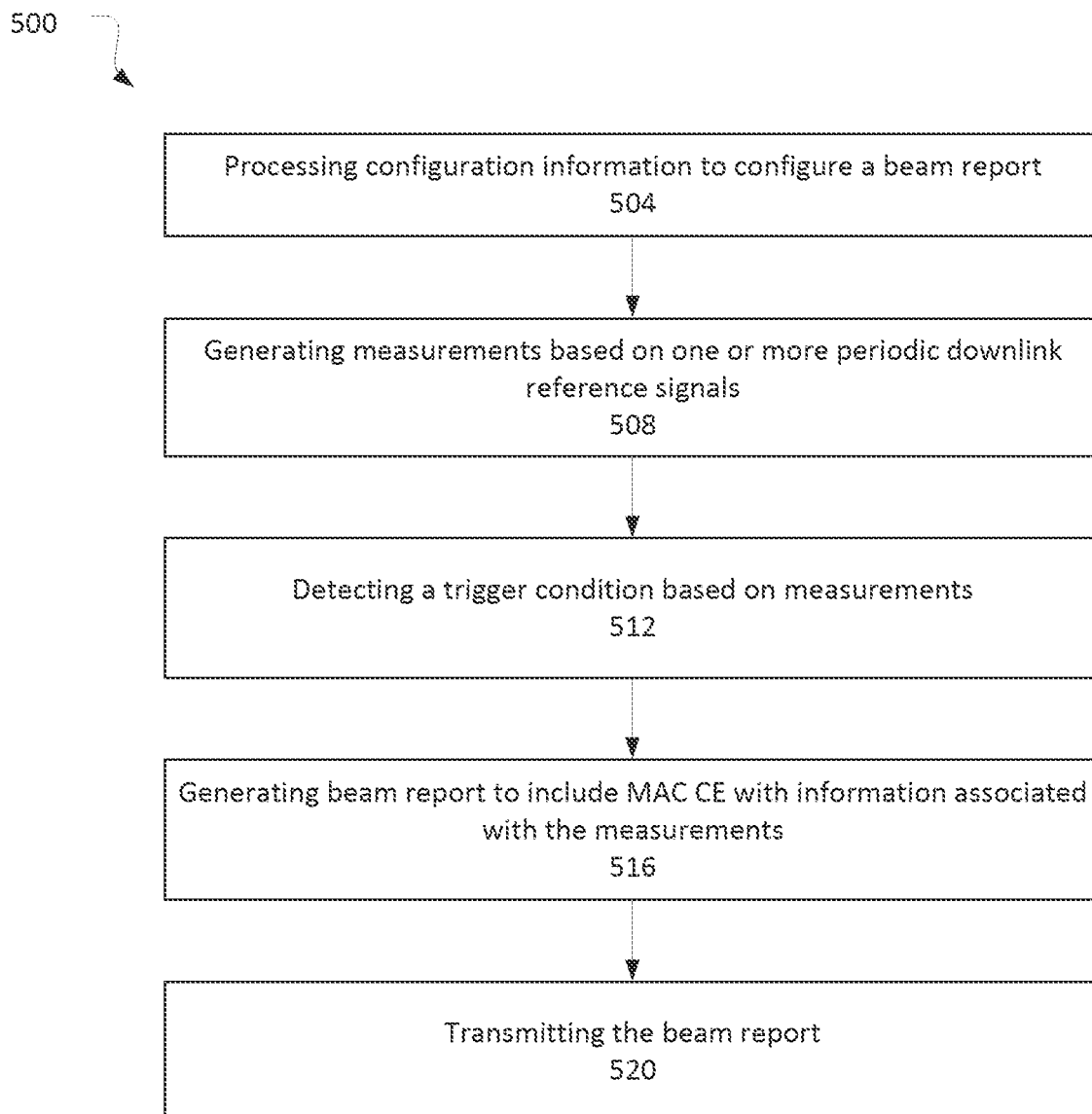
FIG. 5 illustrates another operational flow/algorithmic structure in accordance with some embodiments.

FIG. 5 may include an operation flow/algorithmic structure 500 in accordance with some embodiments. The operation flow/algorithmic structure 500 may be performed or implemented by a UE such as, for example, UE 104 or 900; or components thereof, for example, baseband processor 904A.

The operation flow/algorithmic structure 500 may include, at 504, processing configuration information to configure a beam report. The configuration information may be transmitted to the UE 104 in one or more configuration messages from the base station 108. The configuration information may include information regarding the reference signals that are transmitted by the base station 108 or the base station 112. The configuration information may further include indications of timer values (for example, a periodic timer value or prohibit timer value); one or more threshold values (for example, threshold 1, threshold 2, or threshold 3 discussed herein); or a scheduling request identifier.

The operation flow/algorithmic structure 500 may further include, at 508, generating measurements based on one or more periodic downlink reference signals. The UE 104 may receive the periodic downlink reference signals, which may be SSB or CSI-RS, from the base station 108 or the base station 112. The measurements may be RSRP or SINR measurements.

The operation flow/algorithmic structure 500 may further include, at 512, detecting a trigger condition based on the measurements or configuration information. The trigger condition may similar to any combination of the trigger conditions 1-7 discussed herein. For example, the trigger condition may be based on comparing measurement values of new beams to currently active beams with specific threshold offsets applied; expiration of a timer set with a prohibit timer value or a periodic timer value; DRX off duration over a configured threshold; a new Scell activation; an antenna panel switch, or a MAC PDU needing padding bits.

The operation flow/algorithmic structure 500 may further include, at 516, generating a beam report to include a MAC CE with the information associated with the measurements. For example, the MAC CE may include indications of resource indicators, RSRP/SINR values, P-MPR, PHR, serving cell index, bandwidth part index, or antenna panel identifiers.

The operation flow/algorithmic structure 500 may further include, at 520, transmitting the beam report. The beam report may be transmitted in uplink resources that may be acquired in any one of a number of ways. For example, the uplink resources may be preconfigured (for example, by a configured grant or RACH configuration) or may be requested through transmission of a normal or dedicated SR or performing a full contention-based RACH procedure.

Figure 6:
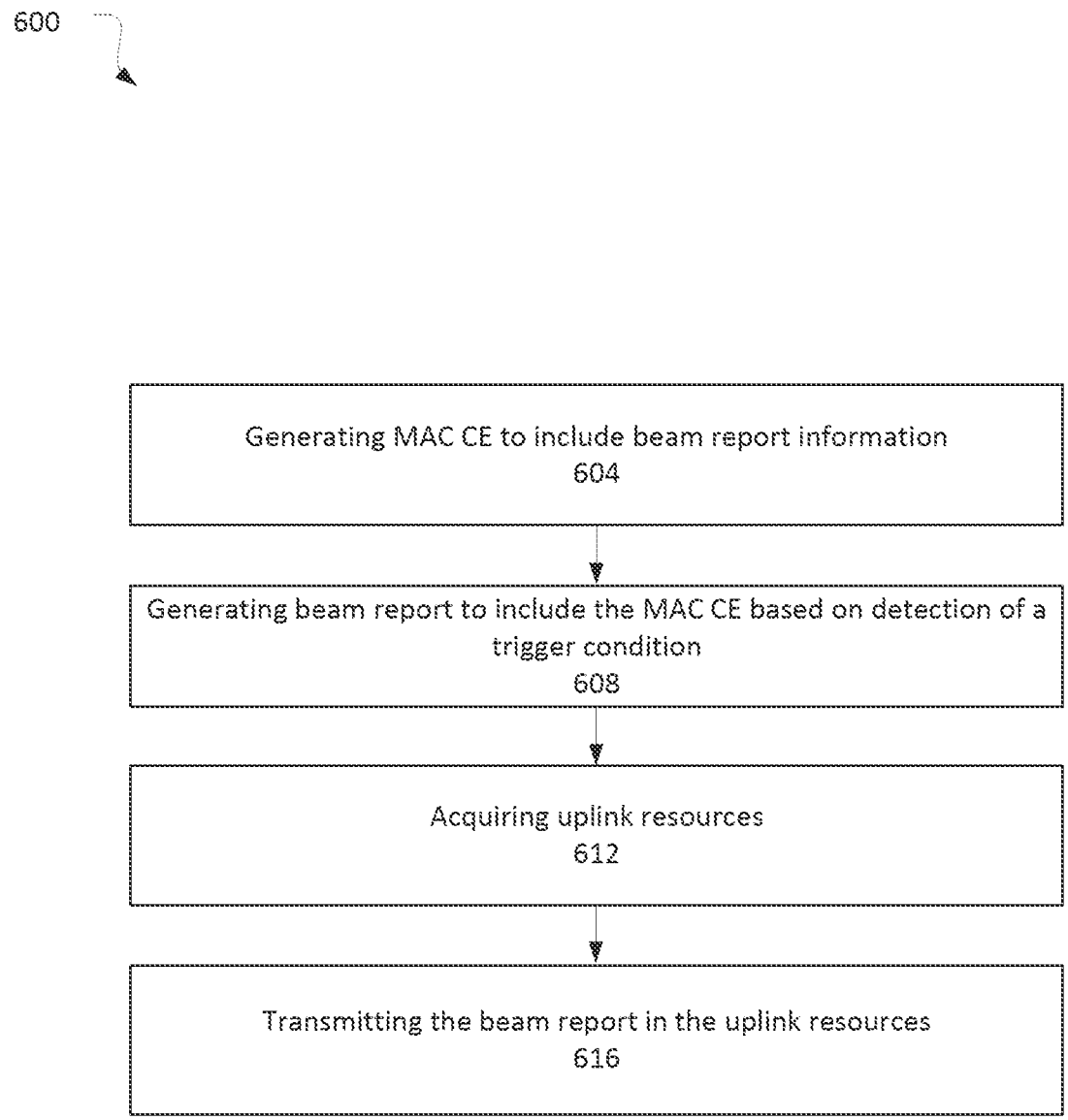
FIG. 6 illustrates another operational flow/algorithmic structure in accordance with some embodiments.

FIG. 6 may include an operation flow/algorithmic structure 600 in accordance with some embodiments. The operation flow/algorithmic structure 600 may be performed or implemented by a UE such as, for example, UE 104 or 900; or components thereof, for example, baseband processor 904A.

The operation flow/algorithmic structure 600 may include, at 604, generating a MAC CE to include beam report information. The beam report information may be based on beam report configuration information and one or more reference signals the respectively correspond to one or more beams. The reference signals may be SSB or CSI-RS. The beam report information may include resource indicators the correspond to the reference signals. The beam report information may further include indications of measurement values, power management values (for example, P-MPR or PHR values), serving cell index, bandwidth part index, or antenna panel identifiers.

In some embodiments, measurement values may be provided for each resource indicator. In other embodiments, only one resource indicator may include a full measurement value. This may correspond to the highest overall measurement value. The remaining resource indicators may include differential measurement values are provided with respect to the full measurement value.

The operation flow/algorithmic structure 600 may further include, at 608, generating a beam report to include the MAC CE based on detection of a trigger condition. The trigger condition may be any combination of the seven trigger conditions described herein.

The operation flow/algorithmic structure 600 may further include, at 612, acquiring uplink resources. The uplink resources may be acquired based on their pre-configuration (for example, by configured grant or RACH resource) or may be acquired by a specific request (for example, SR or full contention-based RACH procedure) and corresponding grant.

The operation flow/algorithmic structure 600 may further include, at 616, transmitting the beam report in the uplink resources.

Figure 7:
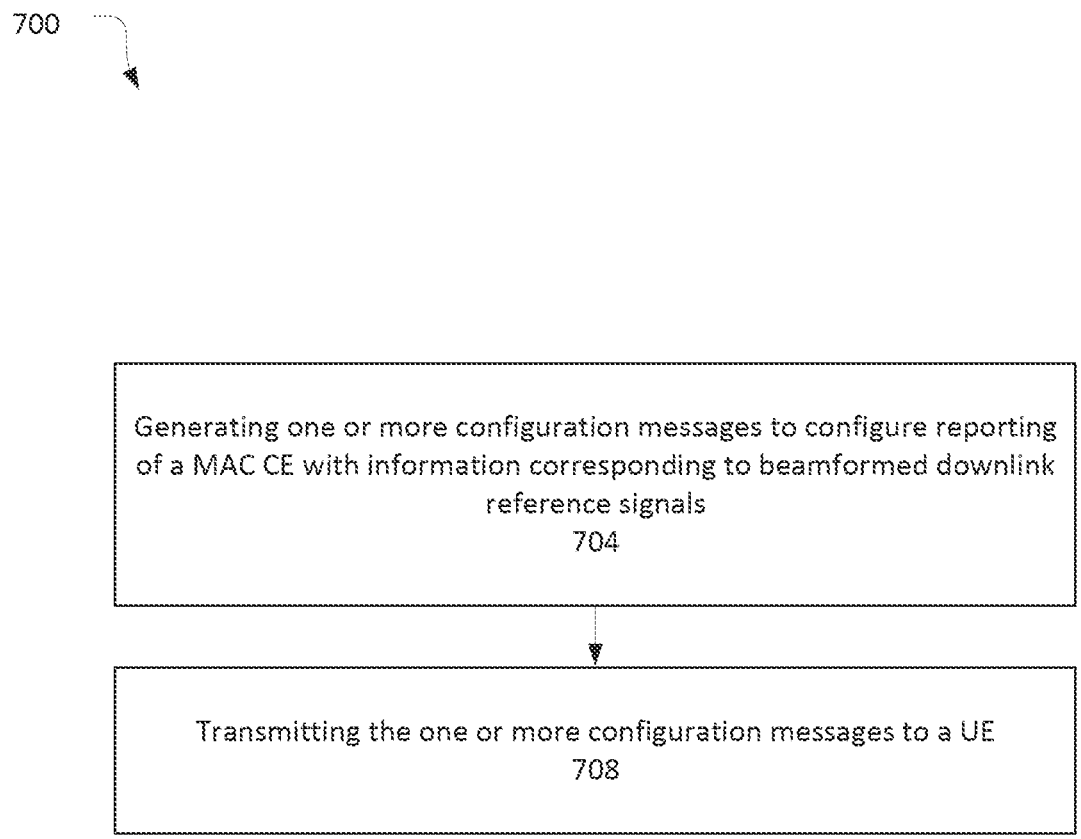
FIG. 7 illustrates another operational flow/algorithmic structure in accordance with some embodiments.

FIG. 7 may include an operation flow/algorithmic structure 700 in accordance with some embodiments. In some embodiments, the operation flow/algorithmic structure 700 may be performed or implemented by a base station, for example, base station 108 or 1000; or components thereof, for example, baseband processor 1004A.

The operation flow/algorithmic structure 700 may include, at 704, generating one or more configuration messages to configure reporting of a MAC CE with information corresponding to beamforming downlink reference signals. The configured information may indicate timer values, threshold values, or scheduling request information (for example, the scheduling request identifier (ID)). The scheduling request ID may be used to configure a scheduling request dedicated to requesting uplink resources for reporting the MAC CE.

The operation flow/algorithmic structure 700 may further include, at 708, transmitting the one or more configuration messages to UE. The configuration messages may transmitted in one or more RRC messages.

Figure 8:
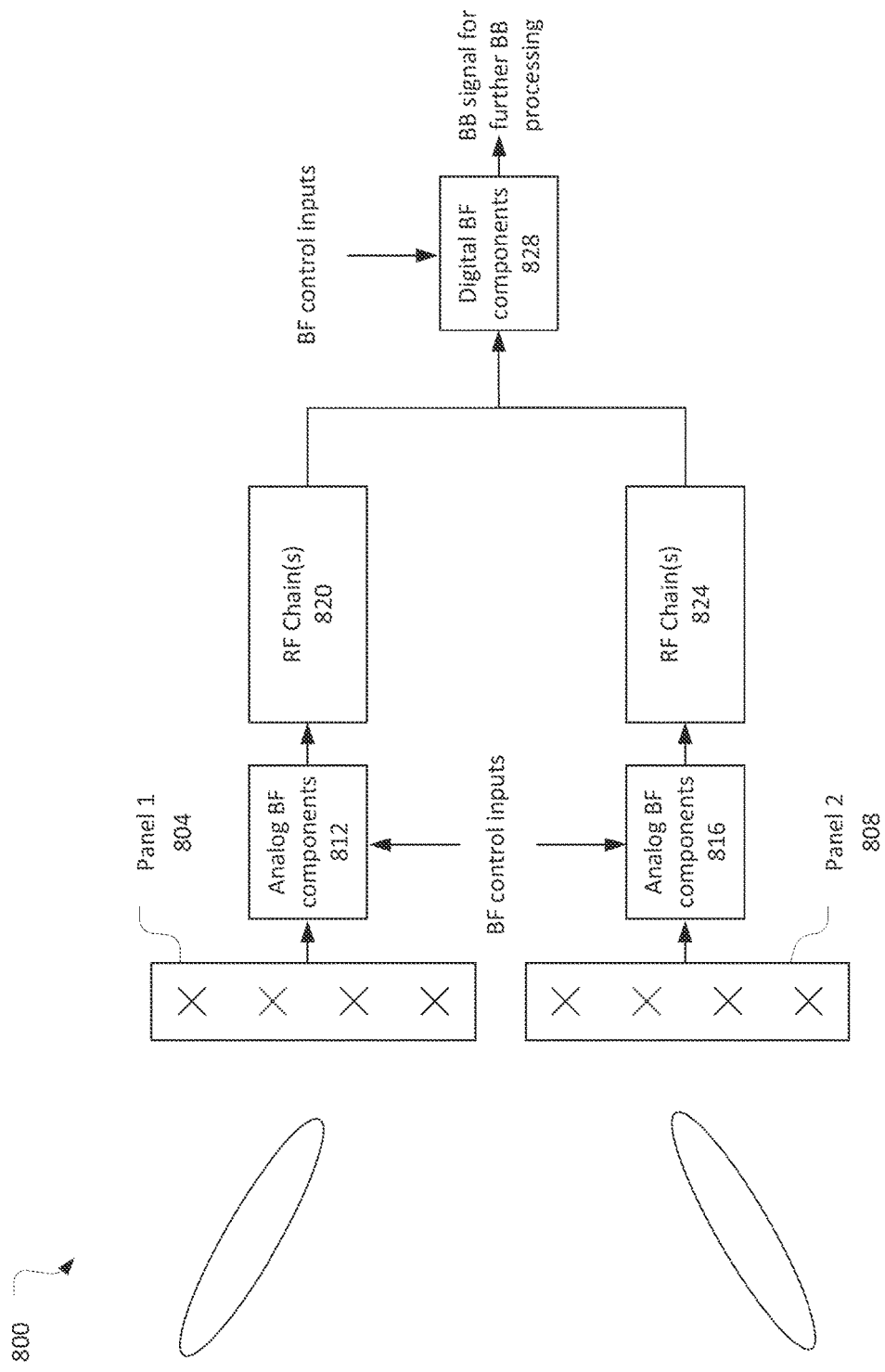
FIG. 8 illustrates beamforming components of a user equipment in accordance with some embodiments.

FIG. 8 illustrates receive components 800 of the UE 84 in accordance with some embodiments. The receive components 800 may include a first antenna panel, panel 1 804, and a second antenna panel, panel 2 808. Each antenna panel may include a number of antenna elements.

The antenna panels may be coupled to respective analog beamforming (BF) components. For example, panel 1 804 may be coupled with analog BF components 812 and panel 2 808 may be coupled with analog BF components 816.

The analog BF components may be coupled with one or more radio-frequency (RF) chains. For example, analog BF components 812 may be coupled with one or more RF chains 820 and analog BF components 816 may be coupled with one or more RF chains 824. The RF chains may amplify a receive analog RF signal, downconvert the RF signal to baseband, and convert the analog baseband signal to a digital baseband signal, which may be provided to digital BF components 828. The digital BF components 828 may provide a baseband (BB signal) for further BB processing.

In various embodiments, control circuitry, which may reside in a baseband processor, may provide BF weights to the analog/digital BF components to provide a receive beam at respective antenna panels. These BF weights may be determined by the control circuitry based on received reference signals and corresponding QCL/TCI information as described herein. In some embodiments, the BF weights may be phase-shift values provided to phase shifters of the analog BF components 812 or complex weights provided to the digital BF components 828. In some embodiments, the BF components and antenna panels may operate together to provide a dynamic phased-array that is capable of directing the beams in the desired direction.

In various embodiments, beamforming may include analog, only digital, or a hybrid analog-digital beamforming. Digital beamforming may utilize separate RF chains that respectively correspond to the antenna elements.

Figure 9:
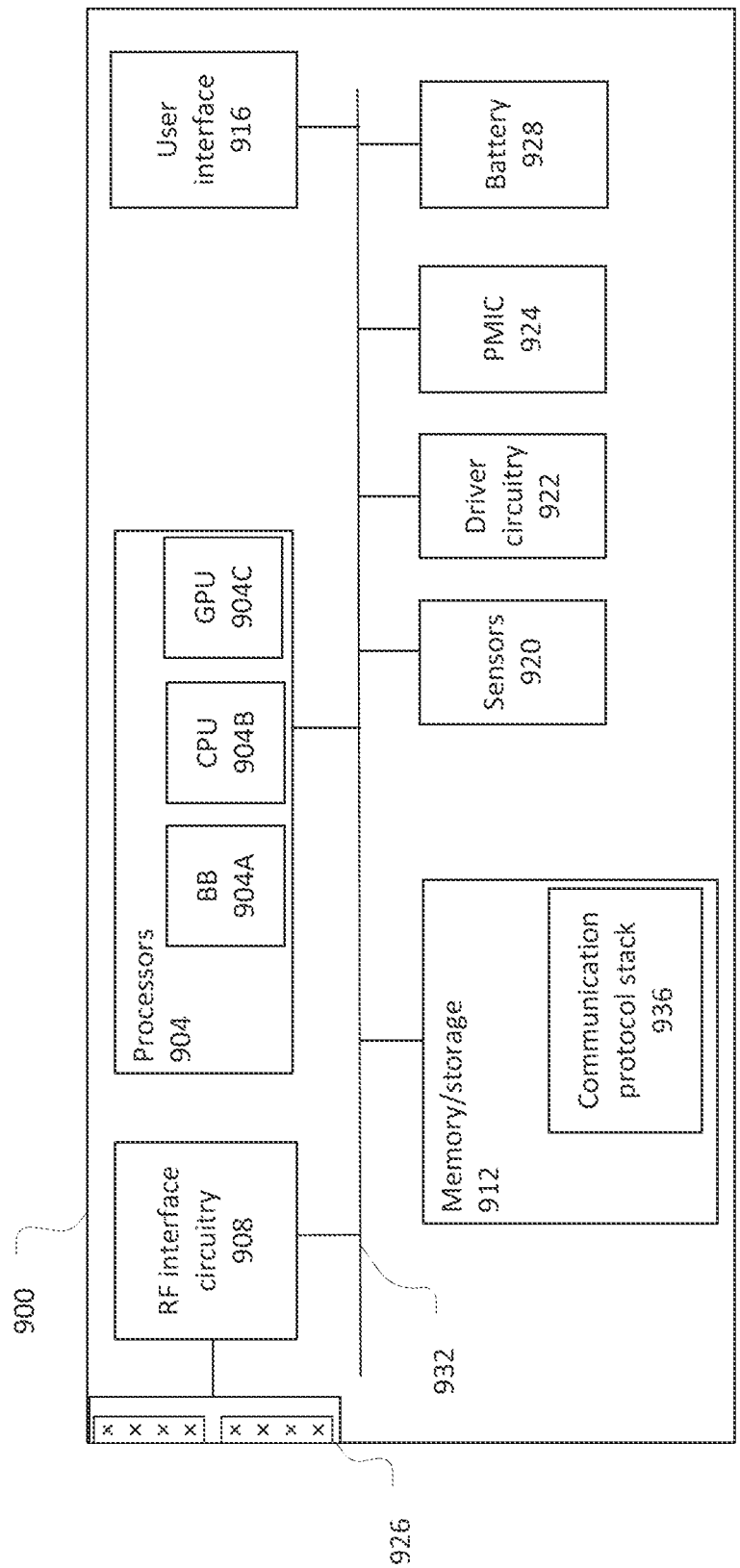
FIG. 9 illustrates a user equipment in accordance with some embodiments.

FIG. 9 illustrates a UE 900 in accordance with some embodiments. The UE 900 may be similar to and substantially interchangeable with UE 104 of FIG. 1.

The UE 900 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 900 may include processors 904, RF interface circuitry 908, memory/storage 912, user interface 916, sensors 920, driver circuitry 922, power management integrated circuit (PMIC) 924, antenna structure 926, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangement of the components shown may occur in other implementations.

The components of the UE 900 may be coupled with various other components over one or more interconnects 932, which may represent any type of interface, input/output, bus (local, system, or expansion), transmission line, trace, optical connection, etc. that allows various circuit components (on common or different chips or chipsets) to interact with one another.

The processors 904 may include processor circuitry such as, for example, baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 912 may include one or more non-transitory, computer-readable media that includes instructions (for example, communication protocol stack 936) that may be executed by one or more of the processors 904 to cause the UE 900 to perform various operations described herein. The memory/storage 912 include any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 908 may include transceiver circuitry and radio frequency front module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 926 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 926.

In various embodiments, the RF interface circuitry 908 may be configured to transmit/receive signals in a manner compatible with NR access technologies.

The antenna 926 may include antenna elements to convert electrical signals into radio waves to travel through the air and to convert received radio waves into electrical signals. The antenna elements may be arranged into one or more antenna panels. The antenna 926 may have antenna panels that are omnidirectional, directional, or a combination thereof to enable beamforming and multiple input, multiple output communications. The antenna 926 may include microstrip antennas, printed antennas fabricated on the surface of one or more printed circuit boards, patch antennas, phased array antennas, etc. The antenna 926 may have one or more panels designed for specific frequency bands including bands in FR1 or FR2.

The user interface circuitry 916 includes various input/output (I/O) devices designed to enable user interaction with the UE 900. The user interface circuitry 916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 920 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 922 may include software and hardware elements that operate to control particular devices that are embedded in the UE 900, attached to the UE 1100, or otherwise communicatively coupled with the UE 900. The driver circuitry 922 may include individual drivers allowing other components to interact with or control various input/output (I/O) devices that may be present within, or connected to, the UE 900. For example, driver circuitry 922 may include a display driver to control and allow access to a display device, a touchscreen driver to control and allow access to a touchscreen interface, sensor drivers to obtain sensor readings of sensor circuitry 920 and control and allow access to sensor circuitry 920, drivers to obtain actuator positions of electro-mechanic components or control and allow access to the electro-mechanic components, a camera driver to control and allow access to an embedded image capture device, audio drivers to control and allow access to one or more audio devices.

The PMIC 924 may manage power provided to various components of the UE 900. In particular, with respect to the processors 904, the PMIC 924 may control power-source selection, voltage scaling, battery charging, or DC-to-DC conversion.

In some embodiments, the PMIC 924 may control, or otherwise be part of, various power saving mechanisms of the UE 900. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 900 may power down for brief intervals of time and thus save power. If there is no data traffic activity for an extended period of time, then the UE 900 may transition off to an RRC_Idle state, where it disconnects from the network and does not perform operations such as channel quality feedback, handover, etc. The UE 900 goes into a very low power state and it performs paging where again it periodically wakes up to listen to the network and then powers down again. The UE 900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 928 may power the UE 900, although in some examples the UE 900 may be mounted deployed in a fixed location, and may have a power supply coupled to an electrical grid. The battery 928 may be a lithium ion battery, a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
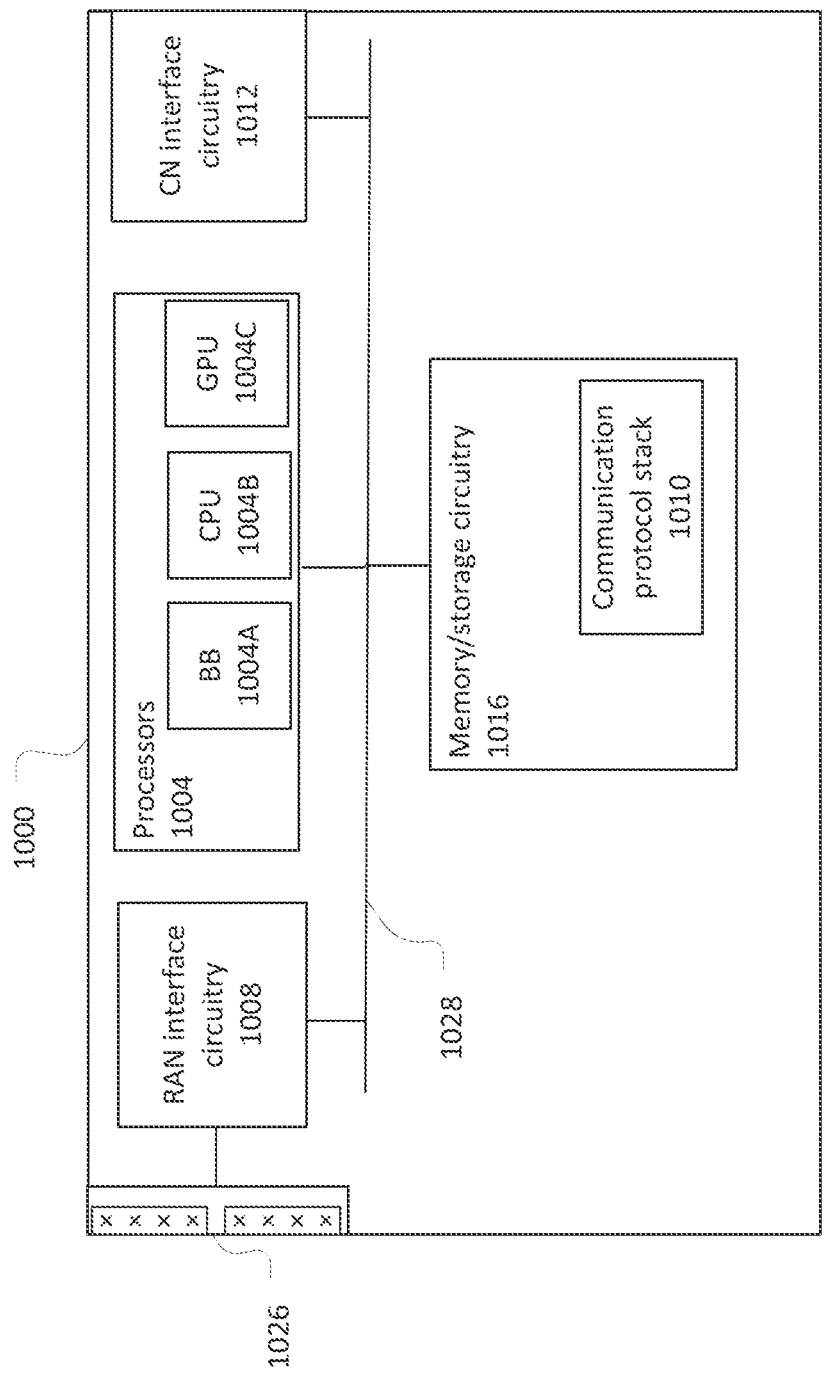
FIG. 10 illustrates a base station in accordance with some embodiments.

FIG. 10 illustrates a gNB 1000 in accordance with some embodiments. The gNB node 1000 may similar to and substantially interchangeable with gNB 108.

The gNB 1000 may include processors 1004, RF interface circuitry 1008, core network "CN" interface circuitry 1012, memory/storage circuitry 1016, and antenna structure 1026.

The components of the gNB 1000 may be coupled with various other components over one or more interconnects 1028.

The processors 1004, RF interface circuitry 1008, memory/storage circuitry 1016 (including communication protocol stack 1010), antenna structure 1026, and interconnects 1028 may be similar to like-named elements shown and described with respect to FIG. 11.

The CN interface circuitry 1012 may provide connectivity to a core network, for example, a 5$^{th}$ Generation Core network "5GC" using a 5GC-compatible network interface protocol such as carrier Ethernet protocols, or some other suitable protocol. Network connectivity may be provided to/from the gNB 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising: processing configuration information to configure a beam report; generating measurements based on one or more periodic downlink reference signals that include synchronization signal block signals or channel state information-reference signals; detecting a trigger condition based on the measurements or configuration information; generating, based on the trigger condition, the beam report to include a media access control (MAC) control element (CE) with information associated with the measurements; and transmitting the beam report to a base station. In some embodiments, the one or more periodic downlink reference signals include both SSBs and CSI-RSs.

Example 2 includes the method of example 1 or some other example herein, further comprising sending a scheduling request to request an uplink resource; processing a scheduling grant to identify the uplink resource; and transmitting the beam report in the uplink resource.

Example 3 includes the method of example 1 or some other example herein, wherein the configuration information is to indicate a periodic timer value or a prohibit timer value, and the method further comprises: setting a timer with the periodic timer value or the prohibit timer value; and detecting the trigger condition based on an expiration of the timer.

Example 4 includes the method of example 1 or some other example herein, wherein the indication is of a prohibit timer value, the measurements include a reference signal receive power (RSRP) or signal-to-interference-plus-noise ratio (SINR) measurement, the configuration information is to further indicate a threshold value, and the method further comprises: determining the RSRP or SINR measurement is larger than each of one or more sums that respectively correspond to one or more active beam measurements plus the threshold value; and detecting the trigger condition based further on said determination the RSRP or SINR measurement is larger than the sum.

Example 5 includes the method of example 4 some other example herein, wherein the one or more active beam measurements correspond to all active beams of the UE.

Example 6 includes the method of example 1 or some other example herein, wherein the configuration information is to indicate a prohibit timer value and a threshold value, the measurement includes a reference signal receive power (RSRP) measurement, and the method further comprises: determining the RSRP measurement minus a power management—maximum power reduction (P-MPR) is larger than each of one or more active beam measurements plus the threshold value.

Example 7 includes the method of example 1 or some other example herein, further comprising detecting the trigger condition based on a determination that padding is to be added to a MAC protocol data unit; or detecting the trigger condition based on an activation of a secondary cell.

Example 8 includes the method of example 1 or some other example herein, wherein the configuration information is to indicate a threshold value and the method further comprises: detecting the trigger condition based on a determination that an off duration of a discontinuous reception (DRX) pattern is larger than the threshold.

Example 9 includes the method of example 1 or some other example herein, wherein the configuration information is to indicate a prohibit timer value and the method further comprises: detecting the trigger condition based further on a switching of an antenna panel from downlink to uplink, from uplink to downlink, from off to on, or from on to off.

Example 10 includes the method of example 1 or some other example herein, wherein the MAC CE is a first MAC CE and the method further comprises: determining a relative priority between the first MAC CE and a second MAC CE based on content of the first and second MAC CEs; and transmit the first MAC CE based on the relative priority.

Example 11 includes the method comprising: storing beam report configuration information; generating a media access control (MAC) control element (CE) to include beam report information based on the beam report configuration information and one or more reference signals that respectively correspond to one or more beams; generating a beam report that includes the MAC CE based on detection of a trigger condition; acquiring uplink resources; and transmitting the beam report in the uplink resources.

Example 12 includes the method of example 11 or some other example herein, wherein the beam report information comprises one or more resource indicators respectively corresponding to the one or more beams, the one or more resource indicators to include one or more synchronization signal block (SSB) indicators or channel state information-reference signal (CSI-RS) resource indicators.

Example 13 includes the method of example 11 or some other example herein, wherein the memory is to store a plurality of measurement values that respectively correspond to a plurality of resource indicators and the beam report information comprises indications of: the plurality of measurement values; or a largest measurement value of the plurality of measurement values and differential measurement values corresponding to the plurality of measurement values other than the largest measurement value, wherein the differential measurement values provide a difference between a respective one of the plurality of measurement values and the largest measurement value.

Example 14 includes the method of example 11 or some other example herein, further comprising storing information for one or more synchronization signal block (SSB) or channel state information-reference signal (CSI-RS) resource indicators that respectively correspond to the one or more beams, and the beam report information comprises an indication of one power management-maximum power reduction (P-MPR) value for the one or more SSB or CSI-RS resource indicators; or one or more P-MPR values that respectively correspond to the one or more SSB or CSI-RS resource indicators.

Example 15 includes the method of example 11 or some other example herein, further comprising storing information for one or more synchronization signal block (SSB) or channel state information-reference signal (CSI-RS) resource indicators and the beam report information includes: an indication of one power headroom (PHR) value for the one or more SSB or CSI-RS resource indicators; or indications of one or more PHR values that respectively correspond to the one or more SSB or CSI-RS resource indicators.

Example 16 includes the method of example 11 or some other example herein, wherein the beam report information includes: a serving cell index to identify a serving cell of a reference signal of the one or more reference signals; or a bandwidth part index to identify a bandwidth part of a reference signal of the one or more reference signals.

Example 17 includes the method of example 11 or some other example herein, further comprising storing information for one or more synchronization signal block (SSB) or channel state information-reference signal (CSI-RS) resource indicators and the beam report information includes: an indication of one identifier to imply an uplink or downlink antenna panel corresponding to the one or more SSB or CSI-RS resource indicators; or indications of one or more identifiers to imply uplink or downlink antenna panels corresponding to the one or more SSB or CSI-RS resource indicators.

Example 18 includes a method of operating a base station comprising: generating one or more configuration messages to configure reporting of a media access control (MAC) element (CE) with information corresponding to beamformed downlink reference signals; and transmitting the one or more configuration messages to a user equipment (UE).

Example 19 includes the method of example 18 or some other example herein, wherein the one or more configuration messages include a scheduling request identifier to configure a scheduling request dedicated to requesting uplink resources for the reporting of the MAC CE.

Example 20 includes the method of example 18 or some other example herein, further comprising: wherein the one or more configuration messages are to configure, for the reporting: a periodic timer; a prohibit timer; or one or more thresholds.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:
   process configuration information to configure a beam report;
   generate measurements based on one or more periodic downlink reference signals that include synchronization signal block signals or channel state information-reference signals;
   detect a trigger condition based on the measurements or configuration information; and
   generate, based on the trigger condition, the beam report to include a media access control (MAC) control element (CE) with information associated with the measurements, the beam report to be transmitted to a base station.

2. The one or more non-transitory computer-readable media of claim 1, wherein the instructions, when executed, further cause the processing circuitry to:
   generate a scheduling request to request an uplink resource; and
   process a scheduling grant to identify the uplink resource, the beam report to be transmitted in the uplink resource.

3. The one or more non-transitory computer-readable media of claim 1, wherein the configuration information is to indicate a periodic timer value or a prohibit timer value, and the instructions, when executed, further cause the processing circuitry to:
   set a timer with the periodic timer value or the prohibit timer value; and
   detect the trigger condition based on an expiration of the timer.

4. The one or more non-transitory computer-readable media of claim 1, wherein the configuration information is to indicate a prohibit timer value, the measurements include a reference signal receive power (RSRP) or signal-to-interference-plus-noise ratio (SINR) measurement, the configuration information is to further indicate a threshold value, and the instructions, when executed, further cause the processing circuitry to:
   determine the RSRP or SINR measurement is larger than each of one or more sums that respectively correspond to one or more active beam measurements plus the threshold value; and
   detect the trigger condition based further on said determination the RSRP or SINR measurement is larger than the sum.

5. The one or more non-transitory computer-readable media of claim 4, wherein the one or more active beam measurements correspond to all active beams of a user equipment (UE).

6. The one or more non-transitory computer-readable media of claim 1, wherein the configuration information is to indicate a prohibit timer value and a threshold value, the measurements include a reference signal receive power (RSRP) measurement, and the instructions, when executed, further cause the processing circuitry to:
   determine the RSRP measurement minus a power management-maximum power reduction (P-MPR) is larger than each of one or more active beam measurements plus the threshold value.

7. The one or more non-transitory computer-readable media of claim 1, wherein the instructions, when executed, further cause the processing circuitry to:
   detect the trigger condition based on a determination that padding is to be added to a MAC protocol data unit; or
   detect the trigger condition based on an activation of a secondary cell.

8. The one or more non-transitory computer-readable media of claim 1, wherein the configuration information is to indicate a threshold value and the instructions, when executed, further cause the processing circuitry to:
   detect the trigger condition based on a determination that an off duration of a discontinuous reception (DRX) pattern is larger than the threshold value.

9. The one or more non-transitory computer-readable media of claim 1, wherein the configuration information is to indicate a prohibit timer value and the instructions, when executed, further cause the processing circuitry to:
   detect the trigger condition based further on a switching of an antenna panel from downlink to uplink, from uplink to downlink, from off to on, or from on to off.

10. The one or more non-transitory computer-readable media of claim 1, wherein the MAC CE is a first MAC CE and the instructions, when executed, further cause the processing circuitry to: determine a relative priority between the first MAC CE and a second MAC CE based on content of the first and second MAC CEs; and transmit the first MAC CE based on the relative priority.

11. The one or more non-transitory computer-readable media of claim 1, wherein the one or more periodic downlink reference signals include a synchronization signal block (SSB) signal and a channel state information-reference signal (CSI-RS).

12. An apparatus comprising:
processing circuitry configured to:
generate a media access control (MAC) control element (CE) to include beam report information based on a beam report configuration information and one or more reference signals that respectively correspond to one or more beams;
generate a beam report that includes the MAC CE based on a detection of a trigger condition;
acquire uplink resources, the beam report to be transmitted in the uplink resources; and
memory interface circuitry coupled with the processing circuitry, to store the beam report configuration information in a memory.

13. The apparatus of claim 12, wherein the beam report information comprises one or more resource indicators respectively corresponding to the one or more beams, the one or more resource indicators to include one or more synchronization signal block (SSB) indicators or channel state information-reference signal (CSI-RS) resource indicators.

14. The apparatus of claim 12, wherein the memory is to store a plurality of measurement values that respectively correspond to a plurality of resource indicators and the beam report information comprises indications of: the plurality of measurement values; or a largest measurement value of the plurality of measurement values and differential measurement values corresponding to the plurality of measurement values other than the largest measurement value, wherein the differential measurement values provide a difference between a respective one of the plurality of measurement values and the largest measurement value.

15. The apparatus of claim 12, wherein the memory is to store information for one or more synchronization signal block (SSB) or channel state information-reference signal (CSI-RS) resource indicators that respectively correspond to the one or more beams, and the beam report information comprises an indication of one power management-maximum power reduction (P-MPR) value for the one or more SSB or CSI-RS resource indicators; or one or more P-MPR values that respectively correspond to the one or more SSB or CSI-RS resource indicators.

16. The apparatus of claim 12, wherein the memory is to store information for one or more synchronization signal block (SSB) or channel state information-reference signal (CSI-RS) resource indicators and the beam report information comprises: an indication of one power headroom (PHR) value for the one or more SSB or CSI-RS resource indicators; or indications of one or more PHR values that respectively correspond to the one or more SSB or CSI-RS resource indicators.

17. The apparatus of claim 12, wherein the beam report information includes: a serving cell index to identify a serving cell of a reference signal of the one or more reference signals; or a bandwidth part index to identify a bandwidth part of a reference signal of the one or more reference signals.

18. The apparatus of claim 12, wherein the memory is to store information for one or more synchronization signal block (SSB) or channel state information-reference signal (CSI-RS) resource indicators and the beam report information comprises: an indication of one identifier to imply an uplink or downlink antenna panel corresponding to the one or more SSB or CSI-RS resource indicators; or indications of one or more identifiers to imply uplink or downlink antenna panels corresponding to the one or more SSB or CSI-RS resource indicators.

19. A method comprising:
generating one or more configuration messages to configure reporting of a media access control (MAC) control element (CE) with information corresponding to beamformed downlink reference signals; and
transmitting the one or more configuration messages to a user equipment (UE).

20. The method of claim 19, wherein the one or more configuration messages include a scheduling request identifier to configure a scheduling request dedicated to requesting uplink resources for the reporting of the MAC CE.

* * * * *